United States Patent [19]

Nakamura et al.

[11] Patent Number: 4,553,073
[45] Date of Patent: Nov. 12, 1985

[54] DEFLECTION CONTROL CIRCUIT WITH LEVEL CONVERSION

[75] Inventors: Takashi Nakamura; Kazunori Yamaji, both of Atsugi, Japan

[73] Assignee: Sony Corporation, Tokyo, Japan

[21] Appl. No.: 356,283

[22] Filed: Mar. 9, 1982

[30] Foreign Application Priority Data

Mar. 11, 1981 [JP] Japan .................................. 56-35075

[51] Int. Cl.[4] ............................................. H01J 29/70
[52] U.S. Cl. ..................................... 315/370; 358/51; 330/275
[58] Field of Search ................ 315/370, 371; 330/275, 330/301, 148, 295; 307/475; 358/51

[56] References Cited

U.S. PATENT DOCUMENTS

| | | | |
|---|---|---|---|
| 4,039,862 | 8/1977 | Dingwall et al. | 307/475 |
| 4,051,512 | 9/1977 | van Roosmalen et al. | 358/51 |
| 4,224,556 | 9/1980 | Muto | 315/396 |

Primary Examiner—Theodore M. Blum
Assistant Examiner—Gregory C. Issing
Attorney, Agent, or Firm—Lewis H. Eslinger; Alvin Sinderbrand

[57] ABSTRACT

A deflection control circuit for a plural-tube color television camera adjusts the deflection sawtooth waves furnished to the red and blue image pickup tubes to register the images thereof with the image of the green pickup tube, and eliminate any centering, skew, rotation, or other errors. The circuit includes a pair of controllable complementary transistors, with current outputs connected together in series. An impedance is connected to the junction of the current outputs, and a sawtooth wave, furnished directly to the green pickup tube, is also supplied therethrough. A correction signal generator preferably formed of an integrated-circuit operational amplifier supplies a correction voltage to control terminals of the transistors so that the current through the latter changes complementarily. An adjusted output sawtooth wave is provided from the junction to the transistors to one of the red and blue pickup tubes. Because the correction signal generator operates at low voltage, such as ±18 V, while the sawtooth wave is provided at a high voltage, such as ±80 V, a level conversion circuit is interposed between the correction signal generator and the control inputs of the complementary transistors. This circuit can include a pair of complementary transistors each having its emitter and collector coupled through respective resistors to the low and high voltages. Alternatively, this circuit can include a pair of complementary common-base transistors, the low voltages being applied thereto as reference levels.

21 Claims, 6 Drawing Figures

DEFLECTION CONTROL CIRCUIT WITH LEVEL CONVERSION

BACKGROUND OF THE INVENTION

1. Field of the Invention:

This invention relates to television cameras, and is more particularly directed to plural-tube color television cameras having image-pickup tubes of the electrostatic deflection type. More specifically, this invention concerns deflection control circuitry in which deflection signals applied to the deflection circuit of an image pickup tube are adjusted to compensate for centering, size, skew, rotation, and the like.

2. Description of the Prior Art:

Conventional television cameras utilize image pickup tubes in which electron beams are scanned in the horizontal and vertical directions in a raster pattern on a photo-conductive target on which an optical image is incident. In a plural pickup tube color television camera, the image is split into separate red, green, and blue portions, and provisions must be incorporated in the color television camera to ensure registration of the three images. For example, centering adjustment, size adjustment, skew adjustment, and rotation adjustment are usually necessary. In the centering adjustment, the center of the effective scan area is moved. In the size adjustment, the size of the effective scan area is changed. In the skew and the rotation adjustment, the effective scan area is rotated.

If the image pickup tube is of the magnetic deflection type, the positions of the deflection coils can be mechanically adjusted to correct for centering, size, rotation, or skew. However, in an image pickup tube of the electrostatic deflection type, electrical adjustment voltages must be added to the sawtooth horizontal and vertical deflection voltages in order to effect the various adjustments.

In a three-tube type color television camera with image pickup tubes of the electrostatic deflection type, deflection voltages are provided from common horizontal and vertical deflection circuits to the horizontal and vertical deflection plates of the respective three image pickup tubes. Unfortunately, the horizontal and vertical deflection plates of the three image pickup tubes are not completely identical, and can vary slightly from one another in mechanical characteristics, such as mounting position and size. Consequently, if the adjusting voltage is merely added to the deflection voltage in the adjusting operation, the deflection relationships of the electron beam in the various image pickup tube will not coincide exactly. Therefore, because of the characteristics of the deflection plates, the three color images will not be in exact registration. Accordingly, color misregistration and color shift will be apparent in any reproduced image reproduced from the television picture signal picked up by the camera.

To address this problem, deflection control circuitry has been previously proposed, for example as disclosed in U.S. patent application Ser. Nos. 282,263, filed July 10, 1981, and 283,358, filed July 14, 1981, now U.S. Pat. No. 4,439,714 each having a common assignee herewith.

In these two previously-proposed circuits, the sawtooth deflection voltages applied to the horizontal and the vertical electrostatic deflection plates of the green, red, and blue pickup tubes are provided from a single deflection voltage generating circuit.

Because the "green" image picked up on the green image pickup tube contains the greatest amount of picture information, the green video signal provided therefrom is used as a reference, and the deflection voltages applied to the electrostatic deflection plates of the red and blue pickup tubes are adjusted by combining compensating voltages with the respective deflecting voltages before application to the deflection plates thereof. Because the green image is used as a reference, the deflecting signals are usually applied without adjustment directly to the deflection plates of the green pickup tube.

In one previously-proposed deflection control circuit, respective differential amplifiers function to modify the horizontal and vertical deflecting voltages in accordance with the respective deflection compensating voltages, and outputs of the differential amplifiers provide the adjusted vertical and horizontal deflecting signals to the deflection plates of the red and blue pickup tubes.

In another previously-proposed deflection control circuit, a pair of complementary transistors are connected in series, for example, with their collectors connected together, and have their bases coupled to an output of the compensating voltage generator. An impedence bridges an output point at the joined collectors of these transistors and an output of the deflection voltage generator, so that an output terminal, at these joined collectors, provides a compensated, or adjusted deflecting voltage to a deflection plate of one of the pickup tubes.

These previously-proposed circuits permit independent adjustments in the deflections of the respective electorn beams in a plural-pickup-tube color television camera, and thereby ensure optimum registration of the green, red, and blue images formed thereon. That is, in such a plural-tube camera, an adjustment in the deflection of the beam in any one tube is not accompanyied by an undesired adjustment in the deflection of any other beam.

A compensation voltage generating circuit generates compensating voltages which are selectively adjustable by a television cameraman or video engineer. These compensating voltages are synchronized with the horizontal and vertical deflecting signals and, accordingly, such deflecting signals are supplied to the generating circuit.

The compensating voltage generating circuit is favorably formed of one or more operational amplifiers with inputs coupled with variable resistors, for receiving the deflecting voltages and various reference voltages, and an output providing an appropriate compensating voltage in accordance with the settings of the variable resistors. In order to reduce circuit complexity and make the deflection control circuit as compact and easy as possible to construct, standard, integrated-circuit operational amplifiers are preferred.

Such integrated circuit devices operate at relative low voltages, and for that reason the supply voltages therefore must be kept low, e.g., at ±18 volts. At the same time, the deflection voltages that are applied across the deflection plates of each of the pickup tubes must be at a comparatively high level, e.g., ±80 volts. Consequently, the transistors used to combine the deflecting signals with the compensating voltages are required to be of a high-voltage type, and are not directly compatible with the output voltages provided from the integrated circuit operational amplifiers used in the compensating voltage generating circuit.

Accordingly, if these two types of circuit elements, i.e., low-voltage operational amplifiers and high-voltage transistors, are to be used together in circuit, special circuitry must be provided therebetween to ensure proper adjustment of the deflecting signals to be supplied to the red and blue pickup tubes.

Unfortunately, such special circuitry has not been available.

OBJECTS AND SUMMARY OF THE INVENTION

It is an object of this invention to provide a deflection control circuit for use with a television camera having a plurality of image pickup tubes to ensure that the deflection relationships of the respective electron beams coincide with one another, and which deflection control circuit avoids the above-mentioned limitations of previously-proposed such circuits.

It is another object of this invention to provide a deflection control circuit in which low-voltage integrated-circuit elements are used to generate compensating voltages, high-voltage transistors are used to mix the compensating voltages with the respective deflecting signals to provide adjusted horizontal and vertical deflecting signals, and level-adjusting circuitry is provided between such integrated-circuit elements and high-voltage transistors to match the output level of the former to the operating requirements of the latter.

According to an aspect of the invention, deflection control circuit apparatus are provided for supplying adjusted deflecting signals to respective horizontal and vertical deflecting inputs of each of several pickup tubes in a plural pickup tube television camera. The apparatus comprises a deflection signal generator providing horizontal and vertical deflecting signals; circuit elements for supplying the horizontal and vertical deflecting signals to respective horizontal and vertical deflecting inputs of a predetermined pickup tube of said camera; a compensating voltage generating circuit having inputs to receive the horizontal and vertical deflecting signals and outputs respectively providing deflection compensating voltages for selected ones of the pickup tubes of said camera; and a combining circuit for combining the respective deflection compensating voltages with corresponding ones of the horizontal and vertical deflecting signals to provide resulting adjusted horizontal and vertical deflecting signals for application to the respective horizontal and vertical deflection inputs of the selected pickup tubes.

In apparatus in which this invention is applied, the compensating voltage generating circuit has a power input connected to a low-level (e.g., ±18 V.) voltage supply and the combining circuit has a power input connected to a high-level (e.g., ±18 V.) voltage supply. In order to match the outputs of the compensating voltage generating circuit with inputs of the combining circuit, a level converting circuit interposed therebetween changes the output level of the compensating voltage generating circuit from the low level thereof to the high level of the combining circuit.

In several embodiments, the combining circuit includes a pair of complementary junction transistors connected in series with collectors thereof joined. In such case, the level converting circuit also includes a pair of complementary transistors each having an emitter electrode coupled through an emitter resistor to the respective supply voltage at the low level, and a collector electrode coupled through a collector resistor to the respective supply voltage at the high level and of the opposite polarity to the above-mentioned low-level supply voltage. The bases thereof are connected to an output of the compensating voltage generating circuit and the collectors provide level-converted compensating voltages.

In other favorable embodiments, the level converting circuit can be formed of an NPN transistor and a PNP transistor each arranged in common-base configuration with respective positive and negative low-level supply voltages being applied to the bases thereof as reference voltages. The emitters of these transistors are each coupled through a respective emitter resistor to an output of the compensating voltage generating circuit, and the respective collectors thereof are coupled through load resistors to positive and negative high-level voltages. The collectors also provide the level-converted compensating voltages.

The above and many other objects, features, and advantages of this invention will become apparent from the ensuing detailed description of certain preferred embodiments, when considered in connection with the accompanying drawings.

DETAILED DESCRIPTION OF CERTAIN PREFERRED EMBODIMENTS

Figure 1:
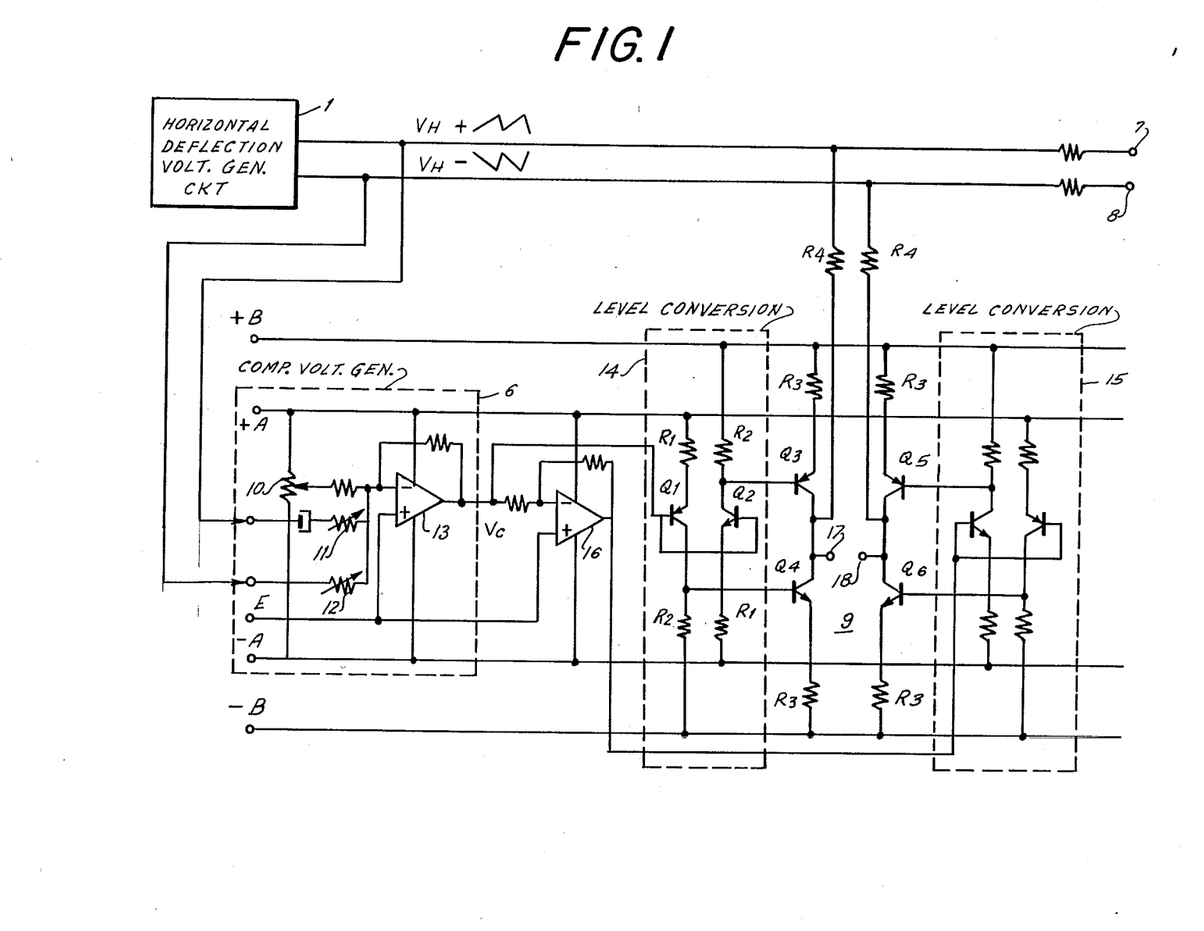
FIGS. 1-5, respectively, are circuit diagram of deflection control circuit according to first through fifth embodiments of this invention.

With reference to the drawings, and initially to FIGS. 1-5 thereof, a deflection control circuit is shown for use with a color television camera having red, green, and blue image pickup tubes, and for compensating deflection sawtooth waves furnished to the red and blue image pickup tubes so that the images thereof are in registration with the image of the green pickup tube. In each of FIGS. 1-5, similar elements are identified with the same reference characters. The pickup tubes are of the electrostatic deflection type, and, as shown in FIG. 6, each have a pair of horizontal deflection plates 2 and 3 and a pair of vertical deflection plates 4 and 5 disposed orthogonally thereto. Horizontal and vertical deflection voltages are applied respectively to the horizontal and vertical deflection plates 2-5 of the three pickup tubes, and such deflection voltages are provided from the output of a common deflection voltage generator 1. As is usual, the green pickup tube, which provides a green signal is used as the reference tube, since, in usual lighting conditions, the green-signal includes more video information than do the blue signal and the red signal from the blue and red pickup tubes, respectively. The output of the common deflection voltage generator 1 is applied to the deflection plates of the green pickup tube. However, before being applied to the other pickup tubes, this deflection voltage must be compensated to account for physical nonuniformities of the deflection plates of the remaining two pickup tubes, and the compensated deflection voltages are then applied to the respective deflection plates of the blue and red pickup tubes so that the blue signal and the red signal will be in registration with green signal. More particularly, as shown in FIG. 1, complementary, oppositely-polarized horizontal deflecting voltages $V_{H+}$ and $V_{H-}$ are applied from the deflection voltage generator 1 to output terminals 7 and 8 which are respectively connected with the horizontal deflection plates 2 and 3 of the green pickup tube. A similar pair of vertical deflection voltages (not shown) are provided to the vertical deflection plates 4 and 5 thereof.

FIG. 1 shows a compensation voltage generator 6 generating horizontal deflection compensating voltages, for example, for the red pickup tube. A combining circuit 9 combines the horizontal deflecting signals produced from the source 1 and the horizontal deflection compensating voltage for the red tube. Similar further generators 6 and combining circuits 9 adjust the horizontal signal to be applied to the blue tube and the vertical deflecting signal to be applied to each of the red and blue tubes. Such circuits 6, 9 are all of similar construction, and only the circuits 6 and 9 for adjusting the horizontal deflecting signals $V_{H+}$, $V_{H-}$ for the red pickup tube are shown.

The horizontal deflection voltages $V_{H+}$ and $V_{H-}$, as well as corresponding vertical deflection voltages $V_{V+}$ and $V_{V-}$, are also supplied to the correcting voltage generator 6. The latter is powered by a double-ended voltage supply of low level, providing voltages of $+A$ and $-A$, for example, $+18$ V and $-18$ V, respectively. A reference level E is also applied thereto.

The compensating voltage generator 6 includes variable resistors 10, 11, and 12 each of which is manually adjustable for correcting centering, size, and skew errors, respectively. An operational amplifier 13 forms the active element of the compensating voltage generator 6, and has an inverting input connected to the variable resistors 10, 11, and 12. A non-inverting input thereof is coupled to receive the reference voltage E. An output of this operational amplifier 13 provides a compensation voltage $V_C$ which is to be applied to the combining circuit 9.

The combining circuit 9 is powered by a double-ended voltage supply of high level, and provides voltages of $+B$ and $-B$, for example, $+80$ volts and $-80$ volts, respectively.

First and second voltage level converters 14 and 15 are provided for converting the level of the compensating signal $V_C$ and for similarly converting the amplitude of an inverted version thereof provided from an inverter 16 coupled to the output of the operational amplifier 13.

The level converters 14 and 15 are of similar construction, and therefore only the detail of the circuit 14 will be described herein.

The first voltage level converter 14 includes a PNP transistor $Q_1$ and an NPN transistor $Q_2$, whose bases are connected together to the output of the compensating voltage generator 6. Respective equal-value emitter resistors $R_1$ couple the emitters of the transistors $Q_1$ and $Q_2$ to the low-level voltages $+A$ and $-A$, respectively. Equal-value collector resistors $R_2$ respectively couple the collectors of these transistors $Q_1$ and $Q_2$ to the high-level voltage supplies $-B$ and $+B$, respectively.

The combining circuit 9 is constituted by two pairs of complementary transistors $Q_3$, $Q_4$ and $Q_5$, $Q_6$, each pair arranged for single-ended push-pull (SEPP) operation. The transistors $Q_3$ and $Q_5$ are PNP transistrs and have their emitters coupled through equal-value emitter resisters $R_3$ to the positive high-level voltage $+B$, while the emitters of the transistors $Q_4$ and $Q_6$ are NPN transistors and have their emitters coupled through similar equal-value emitter resistors $R_3$ to the negative high-level voltage $-B$. The collectors of the transistors $Q_3$ and $Q_4$ are connected together to an output terminal 17, and are also coupled through a load resistor $R_4$ to the horizontal deflection voltage generating circuit 1 to receive the horizontal deflection voltage $V_{H+}$. The collectors of the transistors $Q_5$ and $Q_6$ are similarly connected together to another output terminal 18, and are also connected through a similar load resistors $R_4$ to the horizontal deflection voltage generating circuit 1 to receive the complementary horizontal deflection voltage $V_{H-}$.

The collectors of the transistors $Q_1$ and $Q_2$ of the first voltage level converter 14 are respectively connected to the bases of the transistors $Q_4$ and $Q_3$ of the combining circuit 9. The collectors of corresponding transistors of the second voltage level converter 15 are similarly connected to the bases of the transistors $Q_6$ and $Q_5$. Each of the transistors $Q_1$ and $Q_2$ of the level converter 14 is operated as a class-A amplifier and has a gain, or amplfication factor, of $-R_2/R_1$. Thus, with the arrangement of FIG. 1, a level-converted compensation voltage $-R_2/R_1 \times V_C$ is applied to the bases of the transistors $Q_3$, $Q_4$ of the combining circuit 9.

Further, in the combining circuit 9, the SEPP-arranged transistors $Q_3$ and $Q_4$ have an amplification factor of $-2R_4/R_3$. If the current of the transistor $Q_3$ increases by a factor $\Delta$, the current in the other transistor $Q_4$ decreases by the same amount $\Delta$. Then, a current $2\Delta$ flows through the load resistor $R_4$, and the adjusted deflecting voltage provided at the output terminal 17 is accordingly adjusted by an amount $2 \Delta R_4$.

The transistor $Q_5$ and $Q_6$ operate in a similar but complementary fashion, so that an adjusted deflecting voltage, of similar, but complementary character to that supplied at the output terminal 17, appears at the output terminal 18.

Consequently, the adjusted deflection voltages provided at the output terminal 17 and 18 include a voltage $V_C \times (-R_2/R_1) \times (-2R_4/R_3)$ superimposed on the deflection voltages $V_{H+}$ and $V_{H-}$. Accordingly, if the characteristics of the transistors $Q_1$ and $Q_2$ are substantially the same, any drift which might occur at the high- and low-level sources $+A$, $-A$, $+B$, and $-B$ would be cancelled out. Thus, the adjusted deflecting voltages appearing at the terminals 17 and 18, if applied to the horizontal deflecting plates 2 and 3 of the red pickup tube, will ensure accurate and reliable registration of the red image with the green image.

Figure 2:
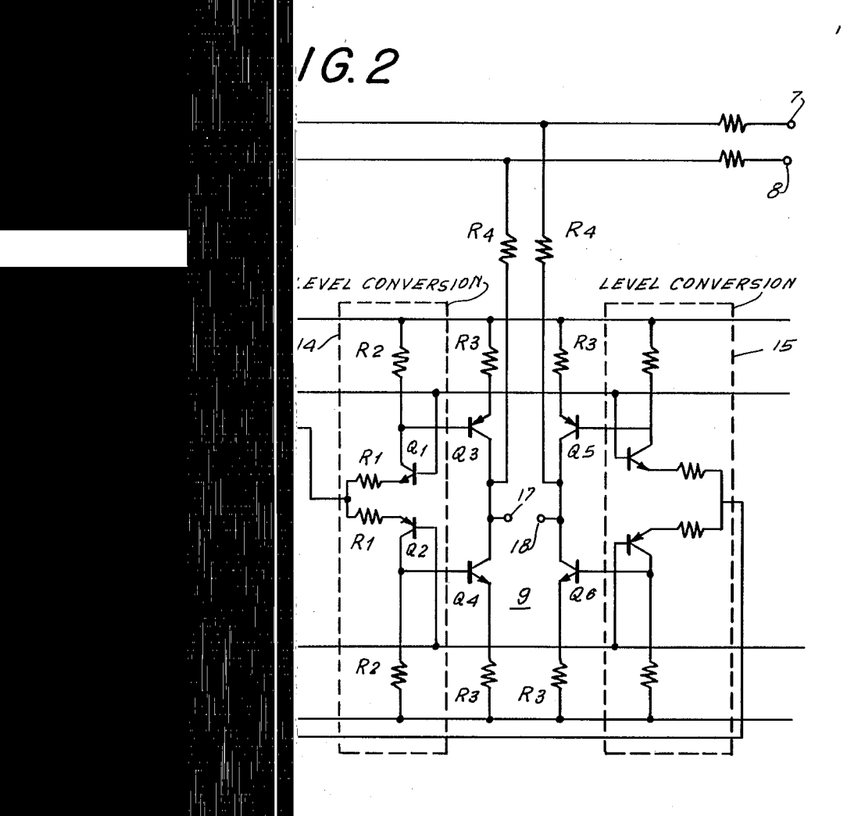

A second embodiment of this invention is shown in FIG. 2. In that embodiment, the construction of the compensating voltage generator 6, the inverter 16, and the combining circuit 9 are essentially the same as in the embodiment of FIG. 1. However, the first and second voltage level converters 14 and 15 have their respective transistors $Q_1$ and $Q_2$ arranged as common-base amplifiers. In this embodiment, the transistor $Q_1$ is an NPN transistor and the transistor $Q_2$ is an PNP transistor. These transistors have their bases respectively connected to the positive and negative low-level voltages $+A$ and $-A$. The emitters thereof are connected through equal-value emitter resistors $R_1$ to the output of the compensating voltage generating circuit 6, and the collectors thereof are connected through respective equal-value collector resistors $R_2$ to the positive and negative high-voltages $+B$ and $-B$. The collectors of the transistors $Q_1$ and $Q_2$ are respectively coupled to the bases of the transistors $Q_3$ and $Q_4$ of the combining circuit 9.

The second voltage level converter 15 has a similar pair of common-base transistors coupled between the inverter 16 and the bases of the transistors $Q_5$ and $Q_6$.

Each of the voltage level converters 14 and 15 has a gain of $R_2/R_1$, so that the net gain for the compensating voltage $V_C$ which appears, superimposed on the horizontal deflecting voltages $V_{H+}$ and $V_{H-}$ appearing at the output terminal 17 and 18, is $(R_2/R_1) \times (-2R_4/R_3)$.

Figure 3:
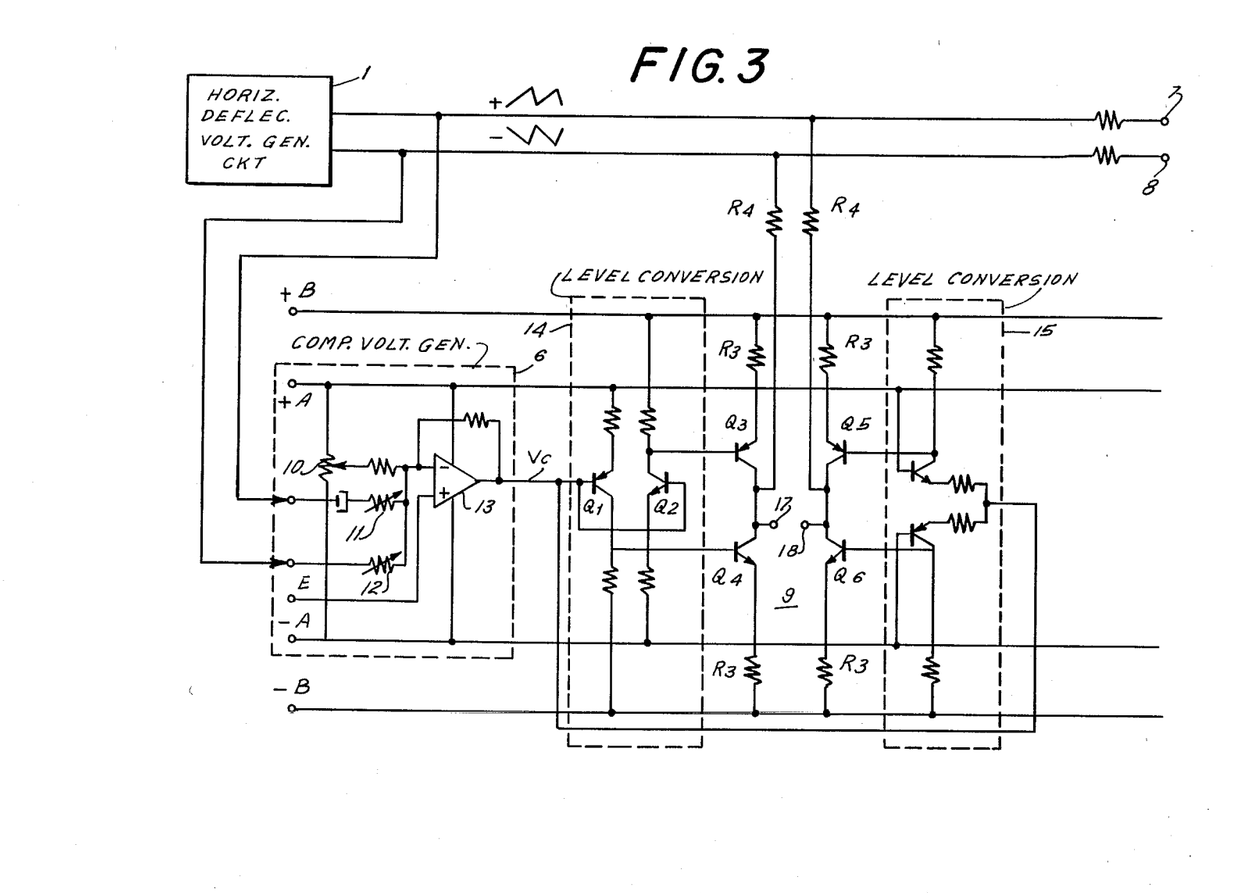

A third embodiment of this invention is shown in FIG. 3. This embodiment is a hybrid of the embodiments of FIGS. 1 and 2, and permits the omission of the inverter 16. The level converter 14 has the same construction as that of FIG. 1, while the second level converter 15 has the same construction as in FIG. 2.

Figure 4:
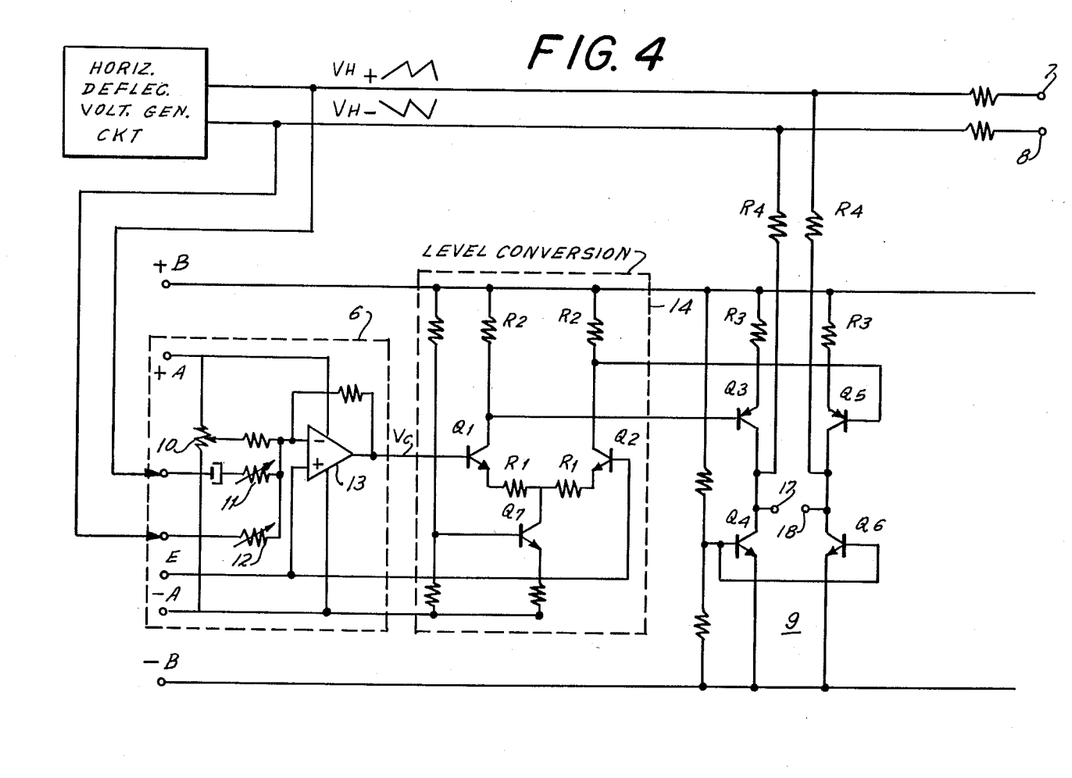

FIG. 4 shows a fourth embodiment of this invention, in which the level converter 14 is constituted by a differential amplifier. In this embodiment, the transistors $Q_1$ and $Q_2$ are both NPN transistors, having their emitters connected through equal-value emitter resistors $R_1$ to a common point, and also having their collectors connected through respective-value collector resistors $R_2$ to the positive high-level voltage $+B$. Another NPN transistor $Q_7$ is arranged as a constant-current source with its collector connected to the common point of the emitter resistors $R_1$, $R_2$, and its emitter connected to the negative low-level voltage source $-A$. The compensating voltage $V_C$ is supplied from the compensating voltage generator 6 to the base of the transistor $Q_1$, while the reference voltage E is supplied to the base of the transistors $Q_2$.

Further in this embodiment, the NPN transistors $Q_4$ and $Q_6$ of the combining circuit 9 are biased as constant current sources. The PNP transistors $Q_3$ and $Q_5$ have their bases connected to the collectors of the transistors $Q_1$ and $Q_2$, respectively. In this embodiment, the collector voltages of the transistors $Q_1$ and $Q_2$ are complementary to one another so that the transistors $Q_3$ and $Q_5$ are driven reversely with respect to each other. The net gain for the compensating voltage $V_C$ at the output terminal 17 and 18 is $(-R_2/R_1) \times (-R_4/R_3) = R_2R_4/R_1R_3$.

In this fourth embodiment, only the single level converter 14 is required, and the inverter 16 is also omitted.

Figures 5, 6:
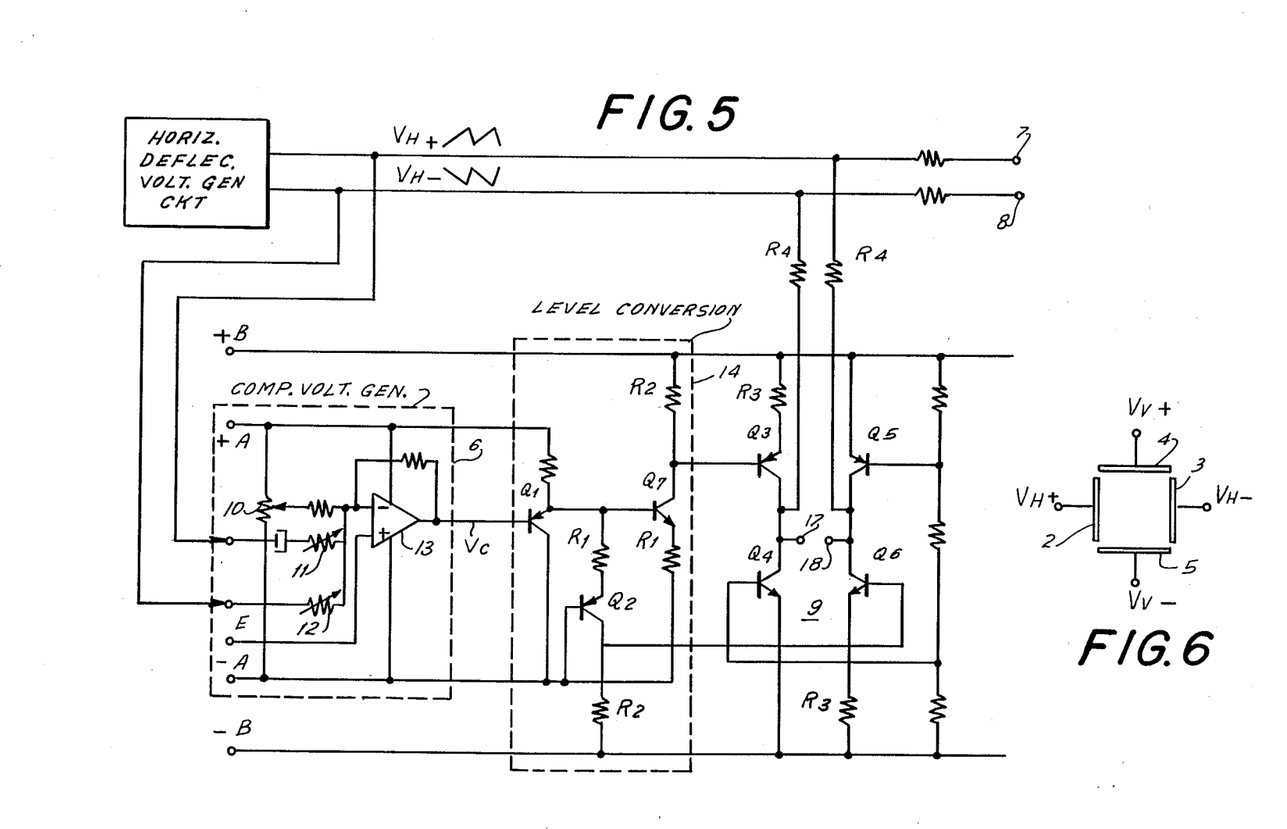
FIG. 6 schematically shows horizontal and vertical electrostatic deflection plates in an image tube of a camera incorporating this invention.

FIG. 5 illustrates a fifth embodiment of this invention, in which the level converter 14 has the transistor $Q_1$ biased as a buffer, or emitter follower with its base connected to the output of the generator 9. The transistor $Q_2$ is a PNP transistor having its base connected to the negative low-level voltage $-A$, its emitter connected through an emitter resistor $R_1$ to the emitter of the emitter follower transistor $Q_1$, and its collector connected through a collector resistor $R_2$ to the negative high-level voltage source $-B$. Here, the other transistor $Q_7$ is an NPN transistor biased as an inverter with its base connected to the emitter of the transistor $Q_1$, its emitter connected through an emitter resistor $R_1$ to the negative low-level voltage $-A$, and its collector connected through a collector resistor $R_2$ to the positive high-level voltage $+B$.

In this embodiment, the NPN transistor $Q_4$ and the PNP transistor $Q_5$ of the combining circuit 9 are each biased as constant current sources, while the PNP transistor $Q_3$ and the NPN transistor $Q_6$ are arranged as inverting amplifiers, with their bases respectively connected to the collectors of the transistors $Q_7$ and $Q_2$. In this fifth embodiment, only the single level converter 14 is required. Consequently, second level converter 15 and the inverter 16 can each be omitted. Further, any temperature drift in the base-emitter voltages of the transistors $Q_7$ and $Q_2$ will be compensated by the buffer transistor $Q_1$.

Similarly to the fourth embodiment, the net gain for the compensating voltage $V_C$ at the output terminal 17 and 18 can be expressed $R_2/R_4/R_1/R_3$.

It should be understood that the foregoing embodiments are offered as illustrations only, and that many modifications and variations thereof will become apparent to those skilled in the art without departing from the scope and spirit of this invention which is to be ascertained from the appended claims.

We claim:
1. Apparatus for supplying adjusted deflecting signals to respective horizontal and vertical deflecting inputs of each of several pickup tubes in a plural pickup tube television camera; comprising:
   a source of horizontal and vertical deflecting signals;
   means for supplying said horizontal and vertical deflecting signals to respective horizontal and vertical deflecting inputs of a predetermined pickup tube of said camera;
   compensating voltage generating circuit means having a plurality of inputs and a plurality of outputs, said inputs receiving said horizontal and vertical deflecting signals, and said compensating voltage generating circuit means being responsive to said horizontal and vertical deflecting signals for generating deflection compensating voltages respectively enabling adjustment of the deflections of selected ones of the pickup tubes of said camera; and
   combining circuit means for combining said respective deflection compensating voltages with corresponding ones of said horizontal and vertical deflecting signals to generate adjusted horizontal and vertical deflecting signals for application to the respective horizontal and vertical deflection inputs of said selected pickup tubes;
   wherein said compensating voltage generating circuit means has a power input connected to a voltage supply of a first level and said combining circuit means has a power input connected to a voltage supply of a second level of substantially greater magnitude than said first level; and further comprising
   level converting circuit means having an input coupled to an output of said compensating voltage generating circuit means and an output coupled to an input of said combining circuit means for converting the level of the deflection compensating voltage applied thereto from a level corresponding to said first level to a level corresponding to said second level.

2. Apparatus according to claim 1; wherein said deflection compensation voltage generating circuit means includes an integrated-circuit operational amplifier as an active element thereof.

3. Apparatus according to claim 1; wherein said voltage supply for said compensating voltage generating circuit means is a double-ended supply providing positive and negative voltage at said first level to the first-mentioned power input thereof and to a further power input thereof, respectively, and said voltage supply for said combining circuit means is a double-ended supply providing positive and negative voltages at said second level to the first mentioned power input thereof and to a further power input thereof, respectively.

4. Apparatus according to claim 3; wherein said combining circuit means includes a pair of complementary transistors each having first and second current-carrying electrodes and a control electrode; respective first resistors each connected between the first current-carrying electrode of an associated one of said transistors and a respective one of the first-mentioned and the further power inputs thereof to receive said positive and negative voltages at said second level; and a load impedance coupled at one end thereof to each of the second current-carrying electrodes of said complementary transistors and to an output terminal, and at another end thereof to said source of horizontal and vertical deflecting signals to receive an associated one of said deflecting signals; the control electrodes of said complementary transistors being coupled to corresponding outputs of said level converting circuit means.

5. Apparatus according to claim 4; wherein said complementary transistors are respectively PNP and NPN junction transistors and said first current-carrying electrodes, said second current carrying electrodes, and said control electrodes thereof are emitters, collectors, and bases, respectively.

6. Apparatus according to claim 4; wherein said level converting circuit means includes a pair of complementary transistors each having a first and a second current-carrying electrode and a control electrode, with the control electrodes thereof being coupled together to an output of said compensating voltage generating circuit means; a pair of respective first resistors each connected at one end to the first current-carrying electrode of an associated one of said pair of transistors and at another end to one of the positive and negative voltages, respectively, at said first level; and a pair of respective second resistors each connected at one end to the second current-carrying electrode of an associated one of said pair of transistors and at another end to one of the negative and positive voltages, respectively, at said second level, said second current-carrying electrodes being coupled to respective ones of the control electrodes of the transistors of said combining circuit means.

7. Apparatus according to claim 6; wherein the pair of transistors of said level converting means are PNP and NPN junction transistors, respectively, and said first current-carrying electrodes, second current-carrying electrodes, and control electrodes thereof are emitters, collectors, and bases, respectively.

8. Apparatus according to claim 7; wherein said first resistors and said second resistors are respectively selected to have substantially equal first and second values.

9. Apparatus according to claim 4; wherein said level converting circuit means includes a pair of complementary transistors each having an input-current electrode, an output-current electrode, and a control electrode, each of said control electrodes being connected to a respective one of the positive and negative voltages at said first level, each of said input-current electrodes being coupled through a respective input resistor to the same one of said outputs of said compensative voltage generating circuit means, and each of said output-current electrodes being connected to the control electrode of a respective one of the transistors of said combining circuit means and through a respective load resistor to a respective one of said positive and negative voltages at said second level.

10. Apparatus according to claim 9; wherein said input resistors and said output resistors are of respective equal resistance values.

11. Apparatus according to claim 4; wherein said level converting circuit means includes an NPN transistor and a PNP transistor each arranged in common-base configuration and having bases respectively coupled to the positive and negative voltages at said first level, emitters coupled through respective equal-value emitter resistors to an output of said compensating voltage generating circuit means, and collectors coupled through respective equal-value resistors to the positive and negative voltages at said second level, the collectors also being coupled to the control electrodes of respective transistors of said combining circuit means.

12. Apparatus according to claim 4; wherein said combining circuit means includes another pair of complementary transistors each having first and second current-carrying electrodes and a control electrode; respective first resistors each connected between the first current-carrying electrode of an associated one of said other pair of complementary transistors and a respective one of the first-mentioned and the further power inputs thereof to receive said positive and negative voltages at said second level; a load impedance coupled at one end to each of the second current-carrying electrodes of said other pair of complementary transistors and to a second output terminal, and at another end thereof to said source of horizontal and vertical deflecting signals to receive another of said deflecting signals complementary to said one deflecting signal; the control electrodes of said other pair of complementary transistors being coupled to respective outputs of said level converting circuit means complementary to said corresponding outputs thereof.

13. Apparatus according to claim 12; wherein said level converting circuit means includes a first level converting circuit having an input connected to one output of said compensating voltage generating circuit means and outputs respectively connected to the control electrodes of the first-mentioned pair of complementary transistors of said combining circuit means, and a second level converting circuit having an input connected to said one output of said compensating voltage generating circuit means and outputs respectively connected to the control electrodes of said other pair of complementary transistors of said combining circuit means.

14. Apparatus according to claim 13; wherein said first level converting circuit includes a third pair of complementary transistors each having a first and a second current-carrying electrode and a control electrode, the control electrodes thereof being connected together to the input of the first level converting circuit; a pair of respective first resistors each connected at one end thereof to respective first current-carrying electrodes of the first level converting circuit and at another end thereof to one of the positive and negative voltages, respectively, at said first level; and a pair of respective second resistors each connected at one end thereof to the second current-carrying electrode of an associated one of said third pair of transistors and at another end thereof to one of the negative and positive voltages, respectively, at said second level; each of said second current-carrying electrodes being coupled to a respective output of said first level converting circuit; and wherein said second level converting circuit includes a fourth pair of complementary transistors each having an input-current electrode, an output-current electrode, and a control electrode, each of said control electrodes being connected to a respective one of the positive and negative voltages at said first level, each of said input-current electrodes being coupled through a respective input resistor to said input of said second level converting circuit, and each of said output-current electrodes being connected to a respective output of the second level converting circuit and through a respective load resistor to a respective one of said positive and negative voltages at said second level.

15. Apparatus according to claim 2; wherein said level converting circuit means includes a differentially-connected pair of transistors each having a first current-carrying electrode, a second current-carrying electrode, and a control electrode, and another transistor connected as a constant current source having a first and a second current-carrying electrode, wherein each of the first current-carrying electrodes of said differentially-connected pair of transistors is coupled through a respective first resistor to the second current-carrying electrode of said other transistor, the first current-carrying electrode of the latter is coupled to one of said positive and negative voltages at said first level, each of the second current-carrying electrodes of said differentially-connected transistors is coupled through a respective second resistor to the one of the voltages at said second level whose polarity is opposite to said one of the voltages at said first level, the second current carrying electrodes of said differentially-connected transistors provide level-converted outputs for said level converting circuit means, and the control electrodes of said differentially-connected transistors are respectively coupled to an output of said compensating voltage generating circuit means and to a point of reference voltage.

16. Apparatus according to claim 15; wherein said combining circuit means is formed of first and second combining circuits, each such combining circuit including a first and a second transistor of complementary types, each such transistor having first and second current-carrying electrodes and a control electrode; means biasing the first transistor as a constant current source with the first current-carrying electrode thereof connected to one of said positive and negative voltages at said second level; a bias resistor connecting the first current-carrying electrode of said first transistor to one of said positive and negative voltages at said second level; a load resistor connected at one end thereof to both of the second current-carrying electrodes of said first and second transistors and at another end thereof to said source of deflecting signals to receive a respective one of two complementary deflecting signals; and an output coupled to said second current-carrying electrodes to provide said adjusted deflecting signals; each of said first transistors having its control electrode coupled to the second current-carrying electrode of a respective one of the differentially-connected transistors of said level converting circuit means.

17. Apparatus according to claim 2; wherein said level converting circuit means includes a first transistor connected in common-base configuration and having an emitter, a base connected to one of said positive and negative voltages at said first level, and emitter resistor coupled between the emitter of said first transistor and a circuit point providing a selected one of said horizontal and vertical deflection compensating voltages, and a load resistor connected between the collector of said first transistor and that voltage at said second level having the same polarity as said one voltage at said first level, said collector being connected to one input of said combining circuit means; and a second transistor having a collector, an emitter, and a base coupled to said circuit point, an emitter resistor coupled between the emitter of said second transistor and said one voltage at said first level, and a load resistor coupled between the collector of said second transistor and that voltage at said second level having its polarity opposite to that of said one voltage at said first level, the collector of said second transistor being connected to another input of said combining circuit means.

18. Apparatus according to claim 17; wherein said level converting circuit means further includes a buffer transistor having a collector, an emitter, and a base connected to an output of said compensating voltage generating circuit means, the emitter thereof being connected through a resistor to one of said positive and negative voltages at said first level and defining said circuit point, and the collector thereof being connected to the other of said voltages at said first level.

19. Apparatus according to claim 17; wherein said combining circuit means is formed of first and second combining circuits, such combining circuits including a respective first and a respective second transistor of complementary types, each such transistor having first and second current-carrying electrodes and a control electrode; biasing means coupled to the control electrodes of the first transistors of the first combining circuit and the second transistor of the second combining circuit transistors as constant-current sources, the first current-carrying electrodes thereof being connected to respective different ones of said positive and negative voltages at said second level; respective bias resistors connecting the first current-carrying electrodes of the second and first transistors of said first and second combining circuits to respective voltages at said second level having polarities respectively opposite to the levels to which the first current-carrying electrode of the first and second transistors of the associated first and second combining circuit are respectively connected; respective load resistors each connected at one end thereof to the second current-carrying electrodes of both transistors of the respective combining circuit and at another end thereof to said source of deflecting signals to receive a respective one of two complementary deflecting signals; and respective outputs coupled to such second current-carrying electrodes to provide said adjusted deflecting signals; the control electrode of the second transistor of the first combining circuit being coupled to the collector of the second transistor of said level converting circuit means and the control electrode of the first transistor of the second combining circuit being coupled to the collector of the first transistor of said level converting circuit means.

20. Apparatus according to claim 1; wherein said selected ones of the pickup tubes of said camera exclude said predetermine tube.

21. Apparatus according to claim 1; wherein said predetermined tube is a green tube and said selected ones of the pickup tubes of said camera are a red tube and a blue tube, respectively.

* * * * *